United States Patent

[11] 3,634,838

| [72] | Inventor | Carl-Erik Granqvist<br>Lidingo, Sweden |
|---|---|---|
| [21] | Appl. No. | 871,929 |
| [22] | Filed | Oct. 28, 1969 |
| [45] | Patented | Jan. 11, 1972 |
| [73] | Assignee | AGA Aktiebolag<br>Lidingo, Sweden |
| [32] | Priority | Oct. 31, 1968 |
| [33] | | Sweden |
| [31] | | 14739/68 |

[54] APPARATUS FOR DIGITALLY REPRESENTING ANGULAR DISPLACEMENT
6 Claims, 1 Drawing Fig.

[52] U.S. Cl. .................................................. 340/196,
340/198, 340/271, 340/347 SY, 324/83 D
[51] Int. Cl. ........................................................ G08c 19/16
[50] Field of Search ........................................... 340/196,
195, 271, 206, 347 AD, 347 CC, 347 SY, 198;
324/83 D

[56] References Cited
UNITED STATES PATENTS
3,045,230 7/1962 Tripp et al. .................. 340/347
3,231,885 1/1966 Blauvelt et al. ............... 340/347
3,258,667 6/1966 McDonough et al. ........ 340/206

*Primary Examiner*—John W. Caldwell
*Assistant Examiner*—Robert J. Mooney
*Attorney*—Larson, Taylor & Hinds ABSTRACT: A goniometer arrangement providing a digital representation of the angular position of the goniometer rotor includes a high-frequency source, a frequency divider formed by a first counter for deriving low-frequency pulses which are shaped to provide a sinusoidal voltage, and a second counter for counting the periods of the high frequency. The sinusoidal voltage is applied in phase quadrature to the fixed windings of the goniometer and the phase of the output from the second counter, which should correspond to the angular position of the goniometer rotor, is compared with a reference voltage derived from a further fixed winding in the goniometer. The phase of the first counter relative to the second counter is controlled in accordance with this comparison by varying the number of pulses supplied to one of the counters.

PATENTED JAN 11 1972 3,634,838
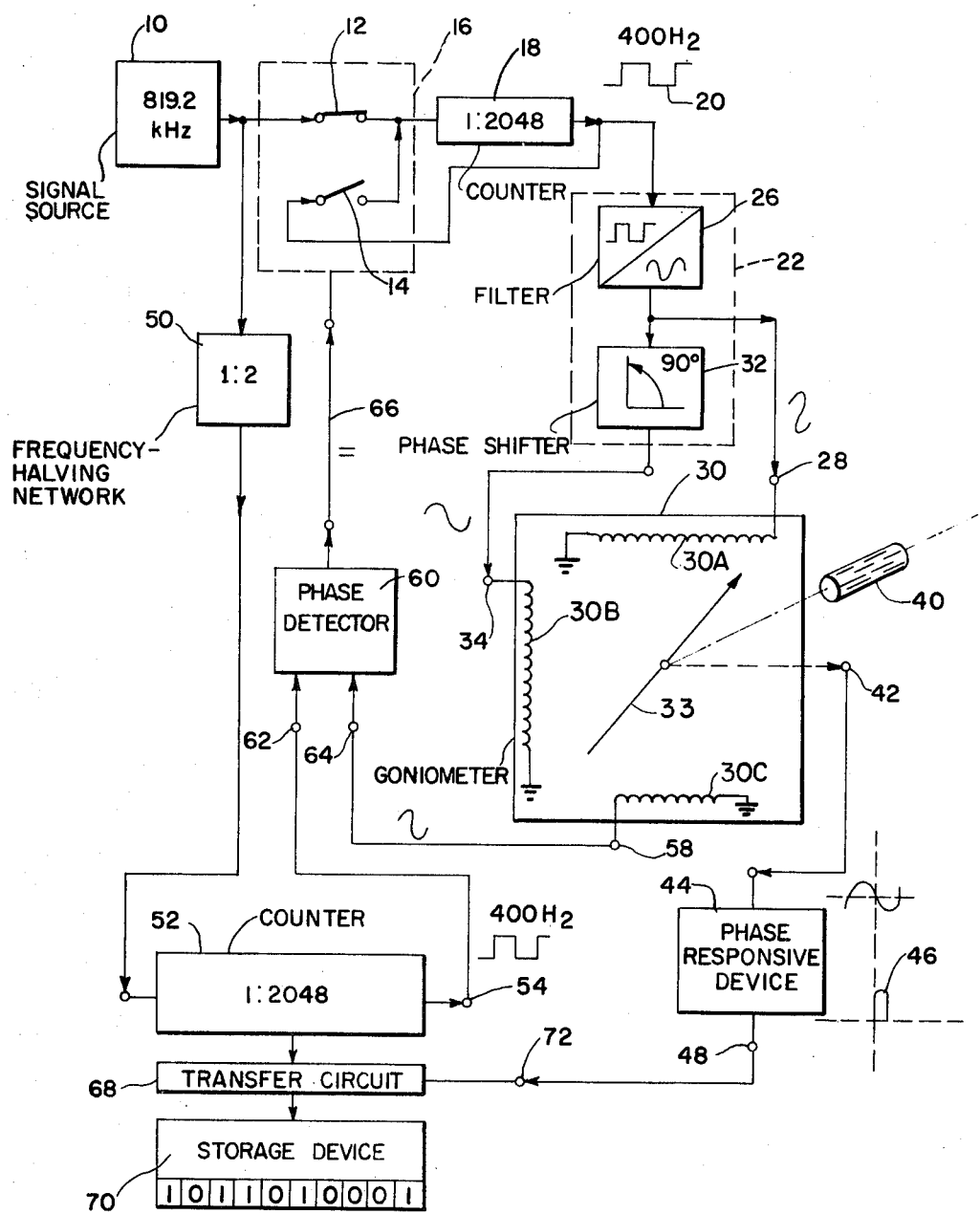
INVENTOR
CARL-ERIK GRANQVIST
BY Larson and Taylor
ATTORNEYS

APPARATUS FOR DIGITALLY REPRESENTING ANGULAR DISPLACEMENT

FIELD OF THE INVENTION

The present invention relates to goniometers and more particularly to an arrangement for digitally representing the angular position of a goniometer rotor such as may be coupled to a shaft or the like whose rotational position is to be indicated.

BACKGROUND OF THE INVENTION

In one conventional type of goniometer a high frequency is generated and a low frequency is derived therefrom by repeated divisions, the periods of the high frequency being counted to obtain additional values corresponding to different phase positions within the period of the low frequency. The low-frequency pulses are shaped so as to provide a sinusoidal voltage which is applied in phase quadrature to the fixed windings of the goniometer to create a rotating field, the periods of the high frequency thus representing subdivisions of one complete rotation of the field so created. If the capacity of a counter connected to receive the high-frequency pulses is equal to the frequency-dividing ratio utilized the counter will operate in synchronism with the rotation of the goniometer field. The phase of the output voltage from the goniometer rotor corresponds to the angular position of the rotor and thus if the count of the counter is determined for a particular phase position in the rotor voltage cycle, this count will represent the angular position of the rotor.

A serious disadvantage of an arrangement such as described hereinabove is that a very high degree of accuracy must be maintained regarding the phase of the rotating goniometer field, which field, as explained, must be precisely synchronous with the cycle of the counter. This high degree of precision is, of course, difficult to achieve for a number of reasons. For example, because the voltage supplied to the goniometer must be made completely free from harmonics through the use of a filter or the like, this voltage is subject to phase inaccuracies caused by aging of components used in the filter.

SUMMARY OF THE INVENTION

In accordance with the present invention a simple and practical solution is provided for the problems discussed hereinabove. In accordance with a presently preferred embodiment of the invention the frequency divider described above comprises a first counter, a second counter being used to count the high-frequency periods. In addition, a phase detector is provided for comparing the phase of an output voltage derived from the second counter with that of a reference voltage derived from the goniometer. The phase of the first counter is controlled relative to the phase of the second counter by varying the number of pulses supplied to one of the counters.

Other features and advantages of the present invention will be set forth in or apparent from the detailed description of a preferred embodiment thereof found hereinbelow.

BRIEF DESCRIPTION OF THE DRAWINGS

The single FIGURE in the drawings is a schematic block diagram of a presently preferred embodiment of the invention.

DESCRIPTION OF A PREFERRRED EMBODIMENT

Referring to the drawings, a high-frequency signal source 10 is connected through a normally closed switch to a frequency divider in the form of a first counter 18. Switch 12 forms part of a signal-adjusting device denoted 16 which also includes a normally open switch 14 whose function is described in more detail hereinbelow. Considering a specific example, source 10 provides an output frequency of 819.2 kHz. and the capacity of the counter 18 is 2,048 so that the output frequency of counter 18 is 400 Hz. Counter 18 includes a series of cascaded flip-flops so that the output thereof is a generally rectangular wave as indicated at 20.

The low-frequency 400 Hz. signal produced by counter 18 is applied to a supply voltage or wave-shaping unit 22 to provide first and second sinusoidal voltages for application to a goniometer 30. Unit 22 includes a filter 26 which smooths the rectangular waveform produced by counter 18 to produce a sinusoidal output voltage which is applied to a first input terminal 28 of goniometer 30, terminal 28 being connected to a first fixed winding 30A of the goniometer 30. The output of filter 26 is also applied to a 90° phase shifter 32 whose output is connected to a second goniometer input terminal 34 which is in turn connected to the other fixed goniometer winding 30B. The rotor 33 of goniometer 30 is coupled to a shaft 40 whose angular position is to be indicated, this coupling being represented schematically by a dot-dashed line as shown. The output voltage of rotor 33 is connected through an output terminal 42 to a phase-responsive device 44. Phase-responsive device 44 responds to a predetermined phase of the rotor voltage such as, for example, the negative-going zeroing thereof as indicated in the drawings, to produce an activating pulse 46 at output terminal 48.

The output of high-frequency signal source 10 is also applied through a frequency-halving network 50 to a second counter 52. Counter 52 has the capacity of 1,024 and thus, for the specific example under consideration, a rectangular wave of frequency 400 Hz. appears at output terminal 54 of counter 52 as indicated.

Goniometer 30 further includes reference-voltage-producing means in the form of a third fixed winding 30C connected to a further output terminal 58.

A phase detector 60 includes first and second input terminals 62 and 64, input terminal 62 being connected to output terminal 54 of counter 52 and input terminal 64 being connected to output terminal 58 of goniometer 30. Phase detector 60 produces a phase control voltage which is positive or negative according to which of the two input voltages leads the other. This phase control voltage is applied to signal-adjusting device 16 through conductor 66 and is utilized to control the position of switches 12 and 14. Thus if the phase control voltage is of one polarity normally closed switch 12 will be actuated and the number of pulses applied to windings 30A and 30B will be decreased. If, on the other hand, a phase control voltage of the other polarity is produced by phase detector 60, normally open switch 14 is actuated and the number of pulses is increased. Thus, the operation of signal-adjusting means 16 is equivalent to adjusting the phase of the output signal from counter 18.

The transfer circuit 68 is connected between counter 52 and a storage device 70. Transfer circuit 68 includes an input terminal 72 which is connected to output terminal 48 of phase-responsive device 44, transfer circuit 68 responding to an activating pulse 46 produced by phase-responsive device 44 to connect counter 52 to the storage device 70 so that the count of counter 52 is transferred to and stored in storage device 70. In the nonactuated state thereof transfer circuit 68 serves to isolate counter 52 from storage device 70.

It is noted that it is, of course, possible to remove halving network 50 and utilize a counter corresponding to counter 52 having a capacity of 2,048 rather than 1,024. However, the arrangement disclosed functions more smoothly where counter 52 and storage device 70 respond to a divided-down frequency such as 4,096 Hz.

Considering the operation of the arrangement discussed hereinabove, winding 30C is arranged to produce a voltage of reference phase. The subdivisions of the period of the reference phase should correspond to the count reached by counter 52 and for this to be true it is necessary that the voltages at terminals 58 and 54 be of equal phase. If a phase difference exists between these voltages phase detector 60 will produce a phase control signal whose polarity corresponds to the polarity of the difference between the count reached by counter 52 and the phase of the reference voltage. For purposes of illustration it is assumed that the voltage output from phase detector 60 is positive when the phase of the voltage at terminal 28 lags the phase of the voltage at terminal 58. A positive voltage produced by phase detector 60 will cause actuation of normally open switch 14 and thus will cause additional pulses to be supplied to terminal 28. If, on the other hand, the phase of the voltage at terminal 28 leads the phase of the voltage at terminal 58 phase detector 60 will produce a negative voltage which will cause actuation of normally closed switch 12 and thus cause one or more of the pulses normally supplied to counter 18 to be suppressed, thereby retarding the phase of the output signal produced by counter 18. This operation will continue until a phase equality exists between the phases of the voltages at terminals 54 and 58.

Under these circumstances, that is, upon the existence of the phase equality discussed above, counter 52 is synchronous with the voltage of reference winding 30C and one period of the 400 Hz. voltage produced is divided by the counter 52 into 1,024 divisions. Thus the count of counter 52 represents the phase of the rotating field of goniometer 30.

The rotor output voltage appearing at terminal 42 is delayed by an amount corresponding to the position of rotor 30A and this delayed voltage is supplied to phase-responsive device 44. As described hereinabove, phase-responsive device 44 produces an activating pulse 46 responsive to a predetermined phase of the rotor voltage, which pulse, when applied to input terminal 72 of transfer circuit 68, causes the count of counter 52 to be transferred to the storage device 70 where this count is indicated digitally as shown.

As stated hereinabove, although the interposition of halving network 50 between source 10 and counter 52 provides the advantage of smoother operation, halving network 50 could, of course, be eliminated. Thus, although the present invention has been described with reference to a particular preferred embodiment thereof it will be understood by those skilled in the art that this modification as well as other modifications not specifically set forth can be effected without departing from the scope and spirit of the invention.

I claim:

1. An arrangement for digitally representing the angular position of the rotor of a goniometer having fixed windings, said arrangement comprising; a high-frequency signal source, a frequency divider comprising a first counter having an input circuit connected to said high-frequency signal source for deriving a divided low-frequency signal therefrom, means for receiving said low-frequency signal, for deriving sinusoidal voltages in phase quadrature from said signal and for supplying said voltages to the fixed windings of the goniometer, a second counter for receiving said high-frequency signal, a storage device for storing the count of said second counter, a transfer circuit connected between said second counter and said storage device and including an activating input circuit, said transfer circuit transferring the count of said second counter in response to the application of an activating pulse to said activating input circuit, phase-responsive means for receiving the output voltage of said goniometer and for generating, in response to a predetermined phase value of said output voltage of said goniometer, an activating pulse in an output circuit thereof, said output circuit being connected to said activating input circuit of said transfer circuit, means for deriving a reference voltage representative of the phase of the voltage of said goniometer, signal-adjusting means connected to said first counter for varying the number of pulses supplied to said first counter in response to a phase control signal thereto, a phase detector having a first input circuit connected to said reference-voltage-deriving means and a second input circuit connected to an output circuit of said second counter for generating a phase control signal, and means for applying said phase control signal to said signal-adjusting means.

2. An arrangement as claimed in claim 1 wherein said signal adjustment means comprises a switch connected between said signal source and said first counter, said switch opening in response to a said control signal having a first polarity.

3. An arrangement as claimed in claim 2 wherein said signal adjustment means comprises a source of additional pulses connected to the input circuit of said first counter for supplying, responsive to a said phase control signal of a second polarity, an additional pulse for application to the windings of said goniometer.

4. An arrangement as claimed in claim 3 wherein said source of additional pulses comprises a normally open switch connected across said first counter.

5. An arrangement as claimed in claim 1 wherein said means for deriving a reference voltage comprises a further fixed winding in said goniometer.

6. An arrangement as claimed in claim 1 wherein the capacity of said second counter is a fraction of the capacity of said first counter and a frequency-dividing stage is connected between said signal source and said second counter.

* * * * *